United States Patent [19]

Flemming

[11] 4,100,827
[45] Jul. 18, 1978

[54] BAR STOCK FEED TUBE ASSEMBLY
[75] Inventor: Norbert A. Flemming, Reading, Pa.
[73] Assignee: The Polymer Corporation, Reading, Pa.
[21] Appl. No.: 784,984
[22] Filed: Apr. 6, 1977
[51] Int. Cl.² .................. B23B 25/00; B23Q 5/22; B65G 11/00; F16L 11/00
[52] U.S. Cl. ................................ 82/38 A; 138/149; 193/38; 214/1.5
[58] Field of Search ............... 82/38 A; 193/38; 138/109, 149; 214/1.5

[56] References Cited
U.S. PATENT DOCUMENTS

| | | | |
|---|---|---|---|
| 3,425,455 | 2/1969 | Kilpert et al. | 138/149 |
| 3,693,810 | 9/1972 | Gumhold | 214/1.5 |
| 3,752,259 | 8/1973 | Wright et al. | 193/38 |
| 3,828,630 | 8/1974 | Argereu | 82/38 A |
| 4,006,654 | 2/1977 | Scheler | 82/38 A |
| 4,025,091 | 3/1977 | Zeile, Jr. | 138/149 |

FOREIGN PATENT DOCUMENTS 2,242,810  3/1974  Fed. Rep. of Germany ...... 82/38 A

Primary Examiner—Harrison L. Hinson
Attorney, Agent, or Firm—Richard O. Church

[57] ABSTRACT

A bar stock feed tube assembly is disclosed of the type in which bar feed stock is supported and guided by, and rotates within, the assembly during machining. The feed tube assembly is comprised of an anechoic feed tube, a surrounding reinforcing jacket, and an intermediate, acoustically-decoupling layer of energy-absorbing material. Retaining caps are provided at the ends of the assembly to protect the end of the anechoic feed tube and its jacket, to act as a stop against axial movement of the assembly, and to retain the feed tube within the reinforcing jacket. By utilizing retaining caps having feed stock-receiving orifices of smaller diameters than the feed tube, the assembly may be adapted for use with a wide range of bar stock sizes.

7 Claims, 7 Drawing Figures

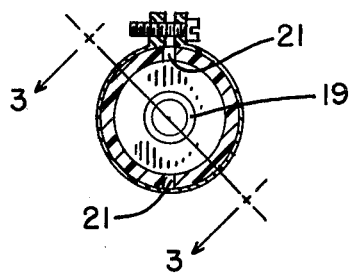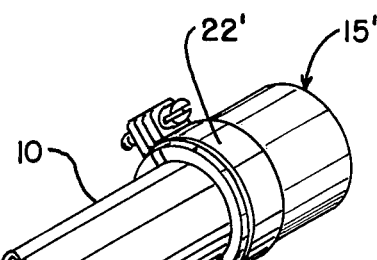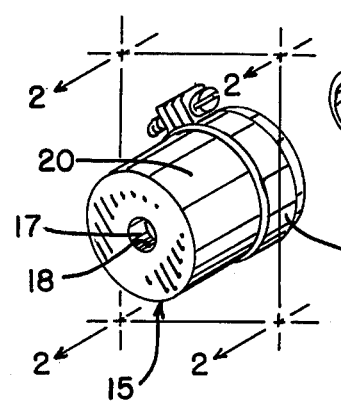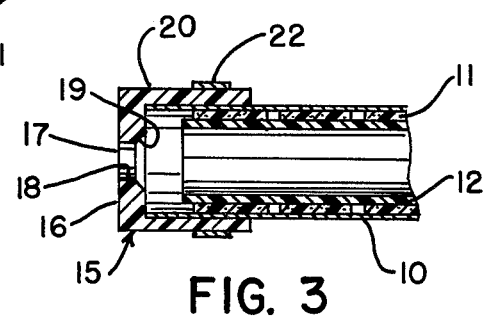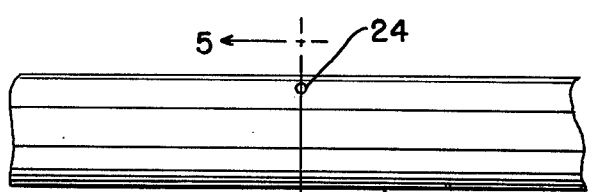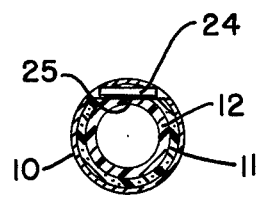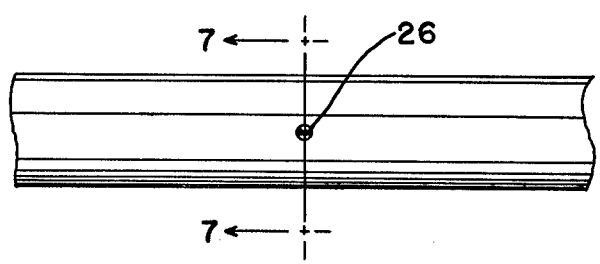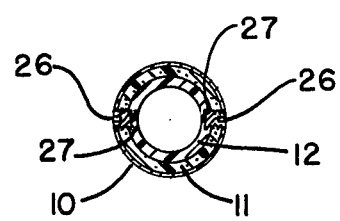

BAR STOCK FEED TUBE ASSEMBLY

BACKGROUND OF THE INVENTION

1. Field of the Invention

This invention relates to an apparatus for forming objects from lengths of bar stock and, in particular, to stock feed tube assemblies for supporting and guiding bar stock to manual or automatic turning and forming machinery such as turret lathes, screw machines and the like.

2. Description of the Prior Art

Feed tubes that employ means for reducing sound level output from the tube as a result of rotating bar stock striking the inside surfaces of the tube are known. First attempts involved the use of inserts of flat metallic ribbons helically wound to define longitudinally-extending guide surfaces within the interior of the tube. Examples of such constructions are shown in U.S. Pat. Nos. 1,891,290 to Tessky, 1,904,329 to Rich, and 2,534,811 to Corlett. Lately, governmental pressures for improved working conditions have provided the impetus for seeking stock feed tubes having still greater reductions in noise output levels.

Suggestions have been made to use feed tubes comprised of anechoic polymeric materials — for example, polyamides and polyethylene. It should be realized that with most metal-turning machines, the stock is rotated at fairly high speeds which, on occasion, may reach speeds as high as 5,000 r.p.m. Under these conditions, if an insufficient running clearance is provided, a significant amount of heat may be developed as a result of the friction forces generated between the stock and the interior guide and support surface of the anechoic feed tube. This condition can result in localized melting of the polymeric liner or severe abrasion or peening of the feed tube that shortens the useful life of the feed tube. Thus, to provide for an acceptable life span, a running clearance is provided between the interior diameter of the feed tube and the peripheral surfaces of the stock being machined to accomodate kinks, bends and other irregularities that commonly occur in metal bar stock. However, if the clearance between the stock and the inner surface of the feed tube is too great, the stock can bend and whip within the feed tube. This results in undue scoring and peening of the liner that also will shorten the life of the liner. The whipping of the stock within the feed tube becomes more intense as the feed stock is consumed and shortened in length since the interior of the tube no longer supports the bar stock to the same axial extent.

One answer to the whipping problem has been the use of feed tubes having liners with inside diameters sufficiently closely related to the stock size so that whipping of the stock is minimized. However, this solution requires a substantial investment by the machine shop operator in several sets of feed tubes of different sizes to process stock of various sizes. Moreover, the changeover to feed tubes of a different size involves additional machine downtime and raises costs.

In previous designs, it has been common to retain the synthetic polymeric feed tubes in outer metallic reinforcing jackets by rivets which extend through the jacket and the feed tube. This is disadvantageous because the rivets score the feed stock and this results in undesirable defacement of the finished products. Also, such systems make replacement of the feed tubes difficult because the rivets must be destructively removed before a new feed tube can be placed within the reinforcing jacket.

Other designs have employed retaining rings that extend into end portions of the reinforcing jacket. These retaining rings are conventionally of a hard metal and are secured by various means such as welding, swaging or riveting. In these designs, replacement of the synthetic polymeric feed tube is difficult because one of the retaining rings must be broken free of the reinforcing jacket to enable the old feed tube to be removed. Further, these designs do not include a means for limiting axial movement of the feed tube assemblies in their supporting structure, such as conventional reels.

SUMMARY OF THE INVENTION

According to this invention, readily removable end caps are mounted on at least one end of a reinforcing jacket into which an anechoic feed tube has been inserted. The end caps include means spaced from an adjacent end of the feed tube for preventing axial removal of the feed tube from the reinforcing jacket. In a preferred embodiment, the end cap also includes means for limiting axial movement of the reinforcing jacket with respect to a structure, such as a reel, in which the tube is mounted. By providing end caps with feed stock orifices of lesser diameter than the interior diameter of the feed tube, bar stock of substantially lesser diameter than that for which the tube was originally designed can be accomodated.

DESCRIPTION OF THE DRAWINGS

FIG. 1 is a partially-exploded perspective view of a stock feed tube in accordance with the present invention;

FIG. 2 is a cross-sectional view of an end cap made in accordance with this invention taken along plane 2—2 of FIG. 1;

FIG. 3 is a cross-sectional view of the end cap and tube taken along line 3—3 of FIG. 2;

FIG. 4 is a side view of a portion of a feed tube assembly showing one arrangement for axially positioning the feed tube with respect to the reinforcing jacket;

FIG. 5 is a cross-sectional view of the arrangement illustrated in FIG. 4 taken along line 5—5;

FIG. 6 is a side view of a portion of a feed tube utilizing another arrangement for axially positioning the feed tube with respect to the reinforcing jacket; and FIG. 7 is a cross-sectional view of the arrangement illustrated in FIG. 6 taken along line 7—7.

As is known, most manual and automatic turning machines are supplied with feed stock through at least one feed tube that supports a rotating length of stock as it is delivered to the machine. Frequently, a plurality of feed tubes are mounted in reels that support the ends of each tube and that have portions that encircle or engage an end of each tube.

With respect to FIG. 1, there is shown a feed tube assembly having features in accordance with the present invention. The assembly is comprised of an outer, substantially tubular reinforcing jacket 10 that is usually of steel. An anechoic feed tube 12 is located within the reinforcing jacket 10 and variously serves to support and guide the bar feed stock (not shown), to absorb vibrations induced by the rotating feed stock, and to prevent surface damage to the rotating feed stock.

Preferably, the feed tube 12 is formed from an abrasion- and impact-resistant synthetic polymeric material having good sound-absorbing or -damping qualities.

One material that has been found to be particularly suitable for this application is ultra high molecular weight polyethylene having a molecular weight generally in the range of 1–6 million. The anechoic feed tube 12 can be formed by extrusion or by other processes such as injection molding or casting. The feed tube 12 has a smooth interior guiding surface 13 that is of a circular configuration and also has a smooth, continuous outer peripheral surface.

As shown in FIGS. 1 and 3, the bar stock feed tube assembly includes a layer 11 of a material capable of absorbing sound and vibrational energy that is disposed between the feed tube 12 and the reinforcing jacket 10 and which serves to decouple the feed tube from its jacket. The decoupling layer 11 can take the form of a ribbon of material helically wrapped about the feed tube 12 or other suitable forms, such as a plurality of axially-spaced annuluses, a single rectangular piece of material wrapped about the feed tube 12, or discontinuous, longitudinally-extending strips. The layer 11 may be secured to the outer surface of the feed tube 12 by a suitable adhesive.

One material that has been found particularly useful for forming the energy-absorbing layer 11 is a resilient polyurethane foam having a density, for example, of about two pounds per cubic foot. The outside diameter of the feed tube 12, the inside diameter of the reinforcing jacket 10, and the thickness of the layer 11 are interrelated so that the layer 11 is held in compression and a snug frictional fit is established between the feed tube and the reinforcing jacket when these elements are assembled.

It should be noted that in FIG. 1, an end portion of the feed tube 12 and portions of the wrap layer 11 are shown as extending (somewhat exaggeratedly) beyond an end portion of the supporting jacket 10. In another embodiment the feed tube 12 is slightly shorter in axial length than the reinforcing jacket 10, with end portions of the feed tube being spaced somewhat from the ends of the reinforcing jacket 10, as illustrated in FIG. 3.

Referring to FIGS. 1 and 2, there is shown an end cap 15 that is mountable on an end of the feed tube assembly. A similar end cap 15' is shown positioned on the other end of reinforcing jacket 10. The end caps 15, 15' are preferably cup-shaped as illustrated in the drawings.

Referring to FIGS. 1, 2 and 3, the cup-shaped end caps 15, 15' include a bottom portion 16 and a cylindrical skirt portion 20. The bottom 16 has an orifice 17 that is positioned so that its longitudinal axis is substantially coaxial with the longitudinal axis of the feed tube. In the embodiment illustrated, the diameter of the orifice 17 is less than the inside diameter of feed tube 12, so that the end cap 15 can adapt the feed tube assembly for use with small diameter stock. However, it should be realized that if the end cap 15 is not being utilized as an adapter, the orifice 17 can be the same as, or greater than, the inside diameter of the inside surface 13 of the feed tube 12. It is only necessary in this case that portions of the orifice 17 extend radially inwardly beyond the outer peripheral edges of the feed tube so that the end cap 15 can prevent movement of the feed tube out of the supporting jacket 10. The walls 18 of the orifice 17 are substantially smooth and form a guiding surface 18 for the bar feed stock extending through the orifice 17. A portion of the orifice 17 may be beveled, as shown at 19, to facilitate the entry of bar feed stock into the orifice 17.

Various means can be utilized for securing a mounting skirt portion 20 of the end cap 15 on the feed tube assembly. In the embodiment illustrated, the skirt 20 is longitudinally split along a portion of its length by slots 21 and is frictionally received over the end of a feed tube assembly by engagement with the outer surface of reinforcing jacket 10. Additional securing force can be achieved by means of a circular clamp 22 that can increase the frictional engagement between the portion 20 and the reinforcing jacket 10. This mounting arrangement renders the retainer readily removable from reinforcing jacket 10 to provide access to the feed tube. Other mounting expedients, such as screw threading, can be utilized.

The cap construction illustrated is advantageous in that the skirt 20 is positioned over the surface of the reinforcing jacket 10 and can act as a stop to prevent the reinforcing jacket from sliding out of its support structure, such as a reel, when a machine operator forcefully slides the assembly axially away from the working machine.

An important aspect of the construction of the end cap 15, especially when designed as an adaptor for adapting the feed tube assembly to run stock of significantly lesser cross section than the cross section of the guiding surface of the feed tube, is that the surface 18 can be made of an impact-resistant, abrasion-resistant material, so that the surface 18 will have an acceptably long life. It has been found desirable, for example, to mold or otherwise form the entire end cap 15 of a high-impact synthetic polymeric material such as, for example, nylon.

The size of the orifice 17 is related to the size of the smaller stock that is to be supported by the feed tube. Sufficient clearance is provided to prevent the build-up of heat from frictional forces, yet is not so great as to allow whipping of the stock. It can readily be seen that by the use of a plurality of end caps 15 having apertures of various sizes, a given feed tube assembly can be adapted to run a wide range of smaller stock sizes. Rather than changing feed tube assemblies, the machine operator merely changes end caps 15.

Anechoic feed tubes of the type herein disclosed expand in length during use for several reasons. The major reason is the thermal expansion of the feed tube. For example, a 20-foot feed tube of polymeric material may increase in length as much as ½ inch due to the temperature increase caused by the rotating feed stock. Some elongation or growth also results from cold flow and creep induced by the continued impaction of the feed stock which peens the interior surface of the feed tube.

Having these considerations in mind, it is important to provide an area into which the feed tube can expand. As shown in FIG. 3, this is accomplished by mounting the end member 16 of the end cap 15 flush against the end of the reinforcing jacket 10 and using a feed tube 12 slightly shorter than the jacket 10. If the feed tube 12 is as long or longer than the jacket 10, expansion of the feed tube 12 can be accomodated by sliding the end cap 15 away from the end of the jacket 10 until sufficient clearance is obtained.

It is also within the scope of this invention to allow for expansion of the feed tube 12 by securing the feed tube 12 from axial movement at a point in between the ends of the jacket 10. Arrangements for effecting such a mounting are illustrated in FIGS. 4 through 7. As shown in FIGS. 4 and 5, the feed tube 12 is held in the reinforcing jacket 10 by a locking means comprised of a retaining pin 24 (Dutch pin) that is inserted through the side walls of the reinforcing jacket 10 and through passage 25 drilled in the feed tube 12. By this arrangement, the feed tube is retained in the reinforcing jacket 10 and the ends of the feed tube are unconstrained and are free to expand axially with respect to the reinforcing jacket 10. If a sized orifice 17 is not needed, and if means other than end cap 15 are used to prevent axial movement of the assembly in its supporting structure, it is within the scope of this invention to utilize the pinning method shown in FIGS. 4 and 5 without the use of end caps.

A similar result is achieved with respect to the arrangement illustrated in FIGS. 6 and 7. In this method, the locking means comprises one or more set screws 26 that axially locate the feed tube in the reinforcing jacket 10. The set screw or screws 26 engage bores 27 drilled in the surface of the feed tube 12.

In the arrangements shown in FIGS. 4 through 7, the feed tube 12 can be readily removed from the reinforcing jacket 10; in the FIG. 4 embodiment by removing the pin 24 and in the FIG. 6 embodiment by removing the set screw or screw 26.

In use, a feed tube assembly of the type illustrated is mounted in a supporting structure, usually comprised of one or more reels for holding one or more feed tubes in an annular array with their longitudinal axes parallel. The feed tube assemblies are usually selected on the basis of the size of the interior diameter of the feed tube 12 and this is governed by the diameter of the bar feed stock that is being machined. The feed tube assemblies are mounted in the supporting reels, usually by sliding the assemblies through tube-engaging members that encircle the periphery of the assembly. End caps of the type illustrated are then mounted on the ends of the assembly to secure the feed tube in the reinforcing jacket and the assembly in the reels. Alternatively, if other means are used to secure the assembly in the reels, pinning means such as shown in FIGS. 4 through 7 may be used to secure the feed tube in the jacket.

In the event it is desired to machine stock of substantially lesser diameter than that initially contemplated, the end cap is removed from the assembly and replaced with an end cap having a smaller orifice, sized to accomodate the stock being machined. The orifice may be defined by a removable annular ring mounted within the end cap or may be in the body of the end cap itself.

A substantial advantage of feed tube assemblies constructed in accordance with the invention is that a single element, the end cap, protects the end of the reinforcing jacket and the feed tube, limits axial movement of the feed tube assembly with respect to its mounting structure, and adapt the feed tube assembly for use with different sizes of bar feed stock.

I claim:

1. A bar stock feed tube assembly comprising an outer, substantially-tubular reinforcing jacket, an anechoic feed tube of synthetic polymeric material mounted within the reinforcing jacket, a resilient sound-damping material disposed under compression between the feed tube and the reinforcing jacket, and an end cap having an orifice adapted to receive bar stock mounted over the end of the feed tube to secure the anechoic feed tube within the reinforcing jacket.

2. Apparatus as in claim 1 wherein the diameter of the orifice of the end cap is less than the outer diameter of the feed tube but greater than the inner diameter of the feed tube.

3. Apparatus as in claim 1 wherein the diameter of the orifice of the end cap is less than the inner diameter of the feed tube.

4. Apparatus as in claim 1 including locking means for preventing axial movement of the end cap.

5. A bar stock feed tube assembly comprising an outer, substantially-tubular reinforcing jacket, an anechoic feed tube of synthetic polymeric material mounted within the reinforcing jacket, a resilient sound-damping material disposed under compression between the feed tube and the reinforcing jacket, an end cap mounted over the end of the feed tube having an orifice adapted to receive bar stock, and a pin passing through the jacket and the feed tube to secure the feed tube within the jacket.

6. A stock feed tube assembly comprising:
   an outer, substantially-tubular reinforcing jacket;
   an anechoic feed tube received in the reinforcing jacket;
   an intermediate wrap of resilient sound-dampening material to acoustically decouple the jacket from the feed tube;
   retaining means mounted on an end of the reinforcing jacket member for retaining the feed tube; and
   a guiding surface, carried by the retaining means, of lesser diameter than the feed tube.

7. Apparatus as in claim 6 wherein the retaining means is an end cap removably mounted over the end of the reinforcing jacket.

* * * * *